United States Patent [19]

White

[11] 4,238,581
[45] Dec. 9, 1980

[54] URETHANE-COUPLED BLOCK POLYMERS OF QUINONE-COUPLED POLYPHENYLENE OXIDES

[75] Inventor: Dwain M. White, Schenectady, N.Y.

[73] Assignee: General Electric Company, Schenectady, N.Y.

[21] Appl. No.: 907,590

[22] Filed: May 19, 1978

[51] Int. Cl.³ .............................................. C08G 65/48
[52] U.S. Cl. .................................. 525/395; 525/453; 525/460; 528/79
[58] Field of Search ...................... 260/47 ET, 47 CZ; 525/395, 453, 460; 528/79

[56] References Cited

U.S. PATENT DOCUMENTS

| | | | |
|---|---|---|---|
| 3,375,228 | 3/1968 | Holoch et al. | 260/47 |
| 3,573,254 | 3/1971 | Factor | 260/47 |
| 3,736,291 | 5/1973 | Vogel | 260/47 R |
| 3,784,575 | 1/1974 | Rutledge | 260/396 R |
| 3,970,640 | 7/1976 | Yonemitsu et al. | 260/47 ET |
| 3,987,068 | 10/1976 | Reilly | 260/396 R |

*Primary Examiner*—Lester L. Lee
*Attorney, Agent, or Firm*—F. Wesley Turner; James C. Davis, Jr.; Joseph T. Cohen

[57] ABSTRACT

Linear, branched and/or cross-linked urethane-coupled block polymers of quinone-coupled polyphenylene oxides are described. The polymers are prepared by contacting polyfunctional isocyanates with quinone-coupled polyphenylene oxides having an average hydroxyl group per molecule value greater than zero including 2.0 or less. The polymers either alone or in combination with other polymers can be formed into useful articles of manufacture by conventional molding, extruding, etc., processing techniques.

19 Claims, No Drawings

URETHANE-COUPLED BLOCK POLYMERS OF QUINONE-COUPLED POLYPHENYLENE OXIDES

CROSS REFERENCE TO RELATED APPLICATIONS

This invention is related to subject matter disclosed in copending U.S. application Ser. Nos. 800,635, 800,641, now U.S. Pat. No. 4,156,699, 800,644, now U.S. Pat. No. 4,165,422, 800,645, now U.S. Pat. No. 4,156,773, 800,646 now U.S. Pat. No. 4,140,675, 800,647, now U.S. Pat. No. 4,154,771, 800,648, now U.S. Pat. No. 4,156,772, 800,656, now U.S. Pat. No. 4,156,770 filed May 26, 1977, respectively; Ser. Nos. 807,990, now U.S. Pat. No. 4,156,771, 808,021, now U.S. Pat. No. 4,158,728, both filed June 20, 1977; and Ser. No. 907,589 filed May 19, 1978. All of the aforesaid applications are assigned to the assignee of this application, and all of the subject matter disclosed and referenced therein is incorporated herein in its entirety by reference.

BACKGROUND OF THE INVENTION

1. Field of the Invention

This invention relates to linear, branched, and/or cross-linked urethane-coupled block polymers of quinone-coupled polyphenylene oxides. The polymers are prepared by contacting polyfunctional isocyanates with quinone-coupled polyphenylene oxides having an average hydroxyl group per molecule value greater than zero including 2.0 or less.

2. Description of the Prior Art

Self-condensation reactions of certain phenols employing oxygen in combination with an effective oxidative coupling catalyst system to form prior art polyphenylene oxides, i.e., polyphenylene oxides having an average hydroxyl group per molecule of 1.0 or less, are described in various U.S. patent applications including Hay's U.S. Pat. Nos. 3,306,879; 3,914,266; 4,028,341, a continuation-in-part of Ser. No. 441,295, filed Feb. 11, 1974, now abandoned; and Olander's U.S. Pat. Nos. 3,956,442; 3,965,069; 3,972,851 and 4,054,553.

Block polymers of prior art polyphenylene oxides employing simple bifunctional coupling compounds such as diacyl halides, diisocyanates, bis(haloaryl)sulfones, etc., are described in White's U.S. Pat. Nos. 3,793,564; 3,770,850; 3,809,729 and 3,875,256.

DESCRIPTION OF THE INVENTION

This invention embodies new linear, branched, and/or cross-linked urethane-coupled polymers of quinone-coupled polyphenylene oxides. The polymers are prepared by contacting polyfunctional isocyanates with quinone-coupled polyphenylene oxides having an average hydroxyl group per molecule value greater than zero including 2.0 or less.

In general, illustrative of the broad group of urethane-coupled block polymers of quinone-coupled polyphenylene oxides that are included within the scope of this invention are those described, among others, by the following model segmented polymer structures:

(I linear) BZB, BZA, BZBZ, ZABZA, BZBZB, AZBZBZBZA, etc., (I branched) $\overset{A}{B}ZB$, $\overset{A}{B}ZB\overset{B}{Z}B$, $\overset{A}{B}ZB\overset{B}{Z}A$, $AZ\overset{AZA}{B}ZBZA$, etc., (I cross-linked) $BZ\overset{A}{B}ZBZB$, $AZ\overset{A}{B}ZBZB$, $AZ\overset{A}{B}ZBZB\overset{A}{Z}A$, etc.,
$\quad\quad\quad\quad\quad\;\;\overset{B}{A}ZBZBZA\;\;\overset{B}{A}ZBZBZA\;\;\overset{B}{A}ZBZBZA$
$\quad\quad\quad\quad\quad\;\;\;\;\;\;\overset{|}{A}\quad\quad\quad\quad\quad\quad\;\;\overset{|}{A}$ The above illustrative model structures include polyfunctional quinone-coupled polyphenylene oxide units represented by —B—, polyfunctional coupling agents units represented by —Z— and $$-\overset{|}{\underset{|}{Z}}-,$$

etc., and monofunctional polyphenylene oxide units represented by —A, which units are described in greater detail hereafter.

In general, the expression "polyfunctional polyphenylene oxides" as employed herein and in the claims includes quinone-coupled polyphenylene oxides having an average hydroxyl group per molecule greater than zero including 2.0 or less. These polyphenylene oxides—which can be prepared by the methods described in U.S. applications Ser. Nos. 800,635 and 800,646—are described by the formula (II) set out hereafter:

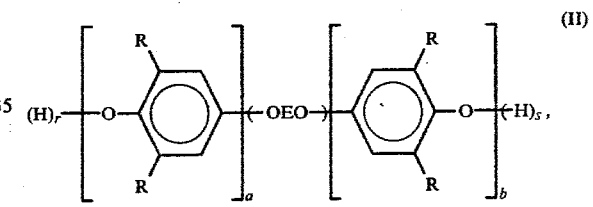

wherein independently each —(OEO)— is a divalent quinone residue, E is a divalent arene radical, either a or b is at least equal to 1, the sum of a plus b is preferably at least equal to 10, more preferably 40 to 170, the sum of r and s being a number average of from about 0.001 to about 2.0, and R is hydrogen, a hydrocarbon radical, a halohydrocarbon radical, a hydrocarbonoxy radical or a halohydrocarbonoxy radical. The polyfunctional polyphenylene oxide units of the block polymers can be conceptualized by the structure of formula (II) above wherein the hydrogen atoms are disassociated from the polyhydroxy groups of the quinone-coupled polyphenylene oxide, e.g. where r and s are equal to zero. When r and s are zero the difunctional radical of formula (II) can be described as a quinone-coupled polyphenoxy radical or a divalent phenoxy radical, and for brevity can be abbreviated as a polymer segment of the formula —B—.

In general, the expression "monofunctional polyphenylene oxides" as employed herein and in the claims includes polyphenylene oxides having an average hydroxyl group per molecule value greater than zero including 1.0 less. These polyphenylene oxides—which can be prepared by any of the methods of the prior art—are described by formula (III) set out hereafter:

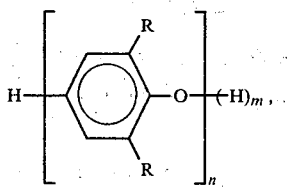 (III)

wherein independently each R is the same as in formula (II) above, n is a number of at least 1, preferably 10, and more preferably 40 to 170, and m being a number average of from 0.001 to about 1.0. The monofunctional polyphenylene oxide units of the block polymers can be conceptualized by the structure of formula (III) above wherein the hydrogen atom is disassociated from the monohydroxy group of the polyphenylene oxide, e.g. where m is zero. When m is zero, the difunctional radical of formula (III) can be described as a phenoxy radical or a monovalent phenoxy residue, and for brevity can be abbreviated as a polymer segment of the formula —A.

In general, the expression "polyfunctional coupling agent" as employed herein and in the claims includes any polyfunctional isocyanate having at least two isocyanate coupling reaction sites. The term "polyfunctional isocyanate" includes, among others, any di- or tri-functional isocyanates illustrated by the formula:

 (IV)

where c is a number at least equal to 2, and R'' is $C_{2-8}$ alkylene, e.g., ethylene, propylene, isopropylene, the various isomeric butylenes, the various isomeric pentylenes, the various isomeric hexylenes (including cyclohexylenes) the isomeric heptylenes, the isomeric octylenes, phenylene, biphenylene, i.e.,

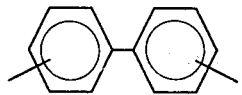

e.g., 2,2'-, 2,3'-, 2,4'-, 3,3'-, 3,4'- and 4,4'- biphenylene; bis(phenylene)-$C_{1-8}$ alkane, i.e.,

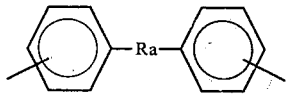

where $R_a$ is $C_{1-8}$ alkylene or alkylidene, e.g., methylene, ethylidene, isopropylidene, butylidene, etc. and the various other examples given above for R''; biphenylene oxide, i.e.,

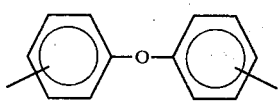

poly ($C_{2-8}$ oxyalkylene), having an average of 2 to 10 repeating units, i.e., $+(R_b-O)_p$ where p is 2–10 and $R_b$ is alkylene, examples of which are given above for R'', and the above-mentioned groups containing a phenylene or biphenylene group, e.g., the various phenylenes, biphenylenes, bis(phenylene)-$C_{1-8}$ alkanes, and (biphenylene) oxides, wherein, one up to the total number of aromatic hydrogens have been replaced with halogen, preferably chlorine, and/or $C_{1-8}$ groups.

Illustrative of specific examples of a portion of presently preferred polyfunctional isocyanates that can be employed are:
polymethylene diisocyanates, e.g.,
ethylene diisocyanate,
trimethylene diisocyanate,
tetramethylene diisocyanate,
hexamethylene diisocyanate,
octamethylene diisocyanate, etc.;
alkylene diisocyanates e.g.,
propylene-1,2-diisocyanate,
butylene-1,2-diisocyanate,
butylene-1,3-diisocyanate,
butylene-2,3-diisocyanate, etc.;
alkylidene diisocyanates, e.g.,
ethylidene diisocyanate,
propylidene diisocyanate,
isopropylidene diisocyanate, etc.;
cycloalkylene diisocyanates, e.g.,
cyclopentylene-1,3-diisocyanate,
cyclohexylene-1,2-diisocyanate,
cyclohexylene-1,3-diisocyanate,
cyclohexylene-1,4-diisocyanate, etc.;
aromatic diisocyanates, e.g.,
o-phenylene diisocyanate,
m-phenylene diisocyanate,
p-phenylene diisocyanate,
1-chloro-2,4-phenylene diisocyanate,
4-chloro-1,3-phenylene diisocyanate,
4,6-dichloro-1,3-phenylene diisocyanate,
2,4,6-tribromo-1,3-phenylene diisocyanate,
2,4,6-trichloro-1,3-phenylene diisocyanate,
tetrachloro-1,3-phenylene diisocyanate,
methylene-4,4'-bis(phenyl isocyanate),
2,4-tolylene diisocyanate,
2,6-tolylene diisocyanate,
3,3'-dimethyl-4,4'-biphenylene diisocyanate,
methylene-4,4'-bis(2-methylphenyl isocyanate),
2,2', 5,5'-tetramethyl-4,4'-biphenylene diisocyanate,
1-chloro-2,4-phenylene diisocyanate,
4chloro-1,3-phenylene diisocyanate,
4,6-dichloro-1,3-phenylene diisocyanate,
2,4,6-tribromo-1,3-phenylene diisocyanate,
2,4,6-trichloro-1,3-phenylene diisocyanate,
tetrachloro-1,3-phenylene diisocyanate, etc.

The polyfunctional isocyanate coupling agent residue of the polymers can be conceptualized by the structure

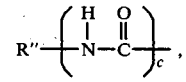

wherein c is a number equal to 2 or 3, etc., R'' being as defined above, and for brevity can be abbreviated in the polymer models in FIG. I as a polymer segment of the formulas —Z—, or

etc.

In general, the process of preparing urethane-coupled block polymers of quinone-coupled polyphenylene oxides comprises contacting polyfunctional polyphenylene oxides and polyfunctional coupling agents in the presence of an aqueous solution of a water soluble base and a catalytic phase transfer agent. Any amount of functional (reactive) polyphenylene oxide and coupling agent can be employed, e.g. from 1/1000 to 1000 times the stoichiometric requirements required to couple all of the reactive polyphenylene oxide.

Any water soluble base can be employed, however preferably is an aqueous solution of a water soluble base, e.g. an aqueous alkaline metal or alkaline earth metal hydroxide or carbonate solution. Specific examples include aqueous solutions of potassium hydroxide, sodium hydroxide, sodium monocarbonate, barium carbonate, etc. Any amount of water soluble base (WSB) can be employed. Generally effective mole proportions of WSB relative to the amount of coupling agent that are employed are coupling agent:water soluble base proportions of from about 1:100 to about 50:1 and more frequently from about 1:10 to about 10:1.

Any catalytic phase transfer agent can be employed, however, preferably is a phase transfer agent selected from the group consisting of quaternary ammonium, quaternary phosphonium, and tertiary sulfonium compounds or mixtures thereof. These catalytic phase transfer agents can be described by the formulas:

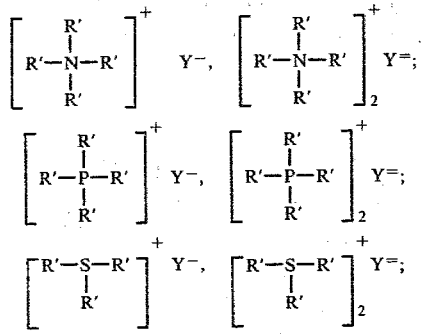

wherein each R' is independently selected from aliphatic hydrocarbon radicals having from about 1 to about 30 carbon atoms, preferably from about 2 to about 15 carbon atoms, each $X^-$ is selected from the group consisting of $Cl^-$, $Br^-$, $F^-$, $CH_3SO_3^-$, $CH_3CO_2^-$, $CF_3CO_2^-$ or $OH^-$, and each $Y^{--}$ is selected from the group consisting of $SO_4^{--}$, $CO_3^{--}$, or $C_2O_4^{--}$. Any amount of catalytic phase transfer agent (PTA) can be employed, however generally effective molar proportions of PTA relative to the amount of water soluble base are within the range of from about 1:10 to about 1:1000 and more frequently within the range of from 1:100 to 1:1000.

The coupling reactions can be carried out at any temperature. Preferably temperatures within the range of from 0° to 150° C. or even higher, and more preferably from 50° C. to 100° are employed.

In order that those skilled in the art may better understand my invention, the following example is given which is illustrative of the best mode of practicing my invention.

EXAMPLE I

(A) Polymer Preparation, and (B) Catalyst Deactivation

A 2.5 gallon stainless steel reactor equipped with an air-driven paddle stirrer, oxygen inlet tube, and water-cooled coil and jacket was charged with 150 g. 2,6-xylenol, 2.3 liters of toluene. 1.5 g. of Adogen ® 464, i.e. trialkyl($C_{8-10}$)methyl ammonium chloride, 3.4 g. N,N'-di-t-butylethylenediamine (DBEDA), 47.5 g. dimethyl-n-butylamine (DMBA), 15 g. di-n-butylamine (DBA), and 4.2 ml. of a catalyst stock solution formed by dissolving 19.30 g. of cuprous oxide in 500 ml. of a chilled 47.2% aqueous hydrobromic acid solution. Oxygen was bubbled through the reaction medium at a rate of 8.3 moles per hour and the mixture was stirred vigorously. 1350 g. of 2,6-xylenol in 1.5 liters of toluene was pumped into the reactor while the reaction temperature was maintained at 25°±1° C. over a 30-minute period. The temperature was then allowed to rise to 35°±1° C. After the desired reaction product viscosity was obtained the reactor was purged of oxygen by passing nitrogen instead of oxygen through the reaction medium and a 38% aqueous solution of a trisodium salt of EDTA, i.e. ethylenediamine tetraacetic acid was added to deactivate the catalyst system. Summarily, the reaction parameters relative to molar ratios of 2,6-xylenol:Cu:DBEDA:DMBA:Br:DBA were as follows: 1124:1:1:8:43:3.2:10.5.

| | Summary of Reaction Parameters and Properties of Poly(2,6-dimethyl-1,4-phenylene oxide) | | | | | |
|---|---|---|---|---|---|---|
| Run No. | TMDQ (%) | React. Temp. (°C.) | React. Time (min.) | [η] (dl./g.) | OH Absorbance @3610cm$^{-1}$ | GPC $M_w/M_n$ |
| 1 | 0.91 | 25-35 | 103 | 0.37 | 0.182 | — |

(C) Quinone Coupling

The reaction mixture as described in sections (A) and (B) above with a steady nitrogen sweep was heated to 50° C. and maintained at 50°-55° C. until the deep orange TMDQ color disappeared leaving a very light green solution. Methanol was added to the reaction mixture to precipitate the polymer. The polymer was collected on a filter, washed with methanol, and dried in a circulating air oven at 90° C.

| | Summary of Reaction Parameters and Properties of Quinone-Coupled Poly(2,6-dimethyl-1,4-phenylene oxide) | | | | | |
|---|---|---|---|---|---|---|
| Run No. | TMDQ (%) | React. Temp. (°C.) | React. Time (min.) | [η] (dl./g.) | OH Absorbance @3610cm$^{-1}$ | GPC $M_w/M_n$ |
| 1 | <0.001 | 50-55 | ~90 | 0.31 | 0.301 | 3.43 |

(D) Coupling With Toluene 2,4-Diisocyanate

A solution containing 10 g. of quinone-coupled polyphenylene oxide prepared as in part (C) above and 30 ml. monochlorobenzene was added to a 300 ml. Waring blender, kept under a nitrogen atmosphere and contacted with 0.5% Adogen ® 464 and 1.3 ml. of a 50% aqueous sodium hydroxide solution. The mixture was stirred in the blender at maximum speed (high fluid shear stress reaction conditions) and 0.19 g. of toluene 2,4-diisocyanate was added over a four minute period. Stirring was continued an additional 2-3 minutes. Toluene was added and the polymer was precipitated by acidification with concentrated HCl and the addition of methanol. The polymer was filtered and dried in vacuo at 60° C. overnight.

The intrinsic viscosity of the polymer before coupling was 0.31 dl./g. and after coupling was 0.47 dl./g.

The diisocyanate coupled quinone-coupled polyphenylene oxide phenolic hydroxyl absorbance at 3610 cm.$^{-1}$ (in carbon disulfide) was 0.026 absorbance units for a 2.5% solution in a 1.0 cm. cell.

As illustrated by the foregoing example, polyfunctional isocyanates can be reacted with quinone-coupled polyphenylene oxides under widely varying reaction conditions to form urethane-coupled quinone-coupled polyphenylene oxides. Preferred urethane coupled polymers prepared in accordance with our process are linear polymers wherein the polymers are essentially linear polymers and more preferably are essentially linear polymers wherein all available hydroxyl components have been end-capped so that the hydroxyl content of the resulting polymer is essentially nil.

The urethane-coupled quinone-coupled polyphenylene oxides of our process can have any intrinsic viscosity and any weight average molecular weight $\overline{M}_w$. Presently preferred polymers of our process generally have an $\overline{M}_w$ value of 10,000 to 120,000, more preferably 30,000 to 60,000, having generally corresponding intrinsic viscosities of 0.17 to 1.7, and 0.4 to 0.7, respectively.

The polymers of this invention can be combined with other fillers, modifying agents, etc., such as dyes, pigments, stabilizers, flame retardant additives with beneficial results.

I claim:

1. A urethane-coupled block polymer of an isocyanate of the formula:

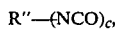

where c is a number at least equal to 2, R" is a C$_{2-8}$ ethylene, a phenylene, a biphenylene, a bis(phenylene) C$_{1-8}$ alkane, or a biphenylene oxide, and a quinone-coupled polyphenylene oxide of the formula:

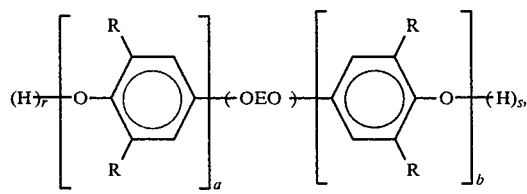

wherein independently each R is hydrogen, a hydrocarbon radical, a halohydrocarbon radical, a hydrocarbonoxy radical or a halohydrocarbonoxy radical, the sum of r and s being from about 0.001 to about 2.0, either a or b is at least equal to 1, the sum of a plus b is at least equal to 10, $-(OEO)-$ is a divalent quinone residue, and E is a divalent arene radical.

2. The claim 1 compound, wherein each R is hydrogen, a hydrocarbon, or a halohydrocarbon radical, and the sum of a plus b is 40 to 170.

3. The claim 1 compound, wherein $-(OEO)-$ is of the formula

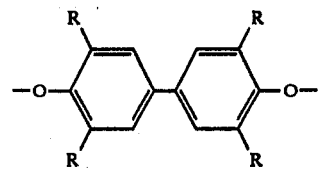

wherein independently each R is as defined hereinbefore

4. The claim 2 compound, wherein each R is a methyl radical.

5. The claim 3 compound, wherein each R is a methyl radical.

6. A process of forming urethane-coupled polymers of quinone-coupled polyphenylene oxide which comprises contacting (I) a polyfunctional isocyanate with (II) a quinone-coupled polyphenylene oxide having an average hydroxyl group per molecule value greater than zero including 2.0 or less.

7. The claim 6 process, wherein (I) the polyfunctional isocyanate is of the formula:

where c is a number at least equal to 2, and R" is a C$_{2-8}$ alkylene, a phenylene, a biphenylene, a bis(phenylene)-C$_{1-8}$ alkane, or a biphenylene oxide; (II) the quinone-coupled polyphenylene oxide is of the formula:

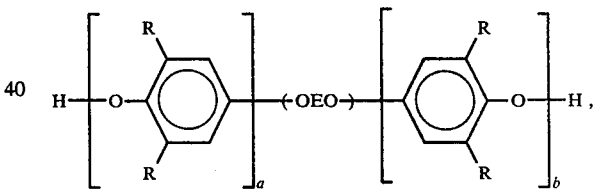

wherein independently each R is hydrogen, a hydrocarbon radical, a halohydrocarbon radical, a hydrocarbonoxy radical or a halohydrocarbonoxy radical, either a or b is at least equal to 1, the sum of a plus b is at least equal to 10, $-(OEO)-$ is a divalent quinone residue, and E is a divalent arene radical; and, optionally, (III) a polyphenylene oxide of the formula:

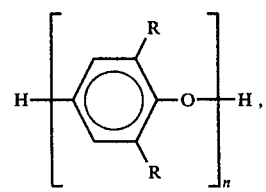

wherein R is as defined above, and n is a number of at least 10.

8. The claim 7 process, wherein $-(OEO)-$ is of the formula:

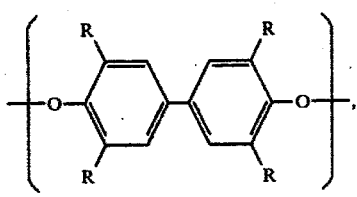

wherein independently each R is as defined hereinbefore.

9. The claim 8 process, wherein the sum of a plus b is 40 to 170.

10. The claim 9 process, wherein each R is hydrogen, a hydrocarbon, or a halohydrocarbon radical.

11. The claim 10 process, wherein each R is a methyl radical.

12. The claim 6 process, carried out in the presence of water soluble base.

13. The claim 12 process, carried out in the presence of a catalytic phase transfer agent.

14. A urethane-coupled block polymer of an isocyanate and a quinone-coupled polyphenylene oxide.

15. A claim 1 compound further comprising a polyphenylene oxide of the formula:

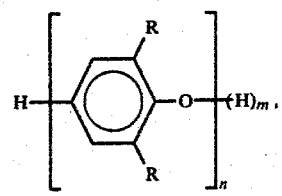

wherein independently each R is as defined hereinbefore, n is a number of at least 10, and m is from about 0.001 to about 1.0.

16. The claim 15 compound, wherein $-(OEO)-$ is of the formula

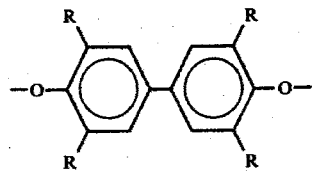

wherein independently each R is as defined hereinbefore.

17. The claim 16 compound, wherein each R is hydrogen, a hydrocarbon, or a halohydrocarbon radical, and the sum of a plus b is 40 to 170.

18. The claim 16 compound, wherein each R is a methyl radical.

19. The claim 17 compound, wherein each R is a methyl radical.

* * * * *